United States Patent [19]

Hauk

[11] 4,435,875
[45] Mar. 13, 1984

[54] IMPROVED PARALLEL ARM WINDSHIELD WIPER ASSEMBLY

[75] Inventor: Klaus Hauk, Altrip, Fed. Rep. of Germany

[73] Assignee: Deere & Company, Moline, Ill.

[21] Appl. No.: 375,070

[22] Filed: May 5, 1982

[30] Foreign Application Priority Data

May 13, 1981 [EP] European Pat. Off. ............ 81302130

[51] Int. Cl.³ .............................................. B60S 1/18
[52] U.S. Cl. ................................................ 15/250.23
[58] Field of Search ............ 15/250.23, 250.22, 250.21

[56] References Cited

U.S. PATENT DOCUMENTS

| | | | |
|---|---|---|---|
| 1,404,772 | 1/1922 | Hueber | 15/250.22 |
| 2,100,055 | 11/1937 | Horton | 15/250.22 |
| 3,525,115 | 8/1970 | Zoltok | 15/250.23 |
| 3,651,699 | 3/1972 | Thomas et al. | 15/250.23 X |
| 3,887,955 | 6/1975 | Jarvinen | 15/250.22 |

FOREIGN PATENT DOCUMENTS

| | | | |
|---|---|---|---|
| 244749 | 3/1947 | Switzerland | 15/250.23 |
| 638836 | 6/1950 | United Kingdom | 15/250.23 |
| 1381818 | 1/1975 | United Kingdom | 15/250.23 |

*Primary Examiner*—Peter Feldman

[57] ABSTRACT

An improved parallel arm windshield wiper assembly is disclosed of the type in which a drive spindle projects through an aperture formed in a windshield. The drive spindle is connected at one end to a motor and has a wiper arm attached to its opposite end. The wiper arm supports a wiper blade which is aligned parallel to a control arm which is also pivotally connected near the outer end of the drive spindle. The ends of the control arm and the wiper arm are connected together by a wiper blade support member which supports a wiper blade. The improvement includes a spacer tube and a sleeve coaxially aligned about the drive spindle with the spacer tube being on the outside. A bracket is mateable with the outer end of the spacer tube and is held in place by a nut threaded onto the sleeve. The bracket is angled outward away from the windshield and has a stud secured to its distal end to which the control arm is pivotally attached. The position of the stud is such that a line drawn between the centerline of the drive spindle and the centerline of the stud combines with the wiper arm, the control arm, and the wiper blade support member to form a parallelogram. This parallelogram permits the wiper blade to maintain a constant orientation throughout its oscillatory sweep of the windshield.

1 Claim, 3 Drawing Figures

IMPROVED PARALLEL ARM WINDSHIELD WIPER ASSEMBLY

FIELD OF THE INVENTION

This invention relates to an improved parallel arm windshield wiper assembly of the type in which a drive spindle projects through a single aperture formed in a windshield.

BACKGROUND OF THE INVENTION

Various types of windshield wiper assemblies are currently available for motor vehicles. Of the type which extend through a windshield, it is common to support and position the wiper arm on a through-the-pane drive spindle which is attached to a motor fixed to the inside cab of the vehicle. In this design, it is necessary to provide a fixed and correctly positioned pivot for a control arm which lies parallel to the wiper arm. In order to ensure a correct position of the control arm relative to the drive spindle, one prior art patent (Switzerland 244,749) has suggested that the control arm supporting shaft also extends through the windshield. However, this solution is unattractive because two holes have to be formed in the windshield and this is both expensive and creates a region of weakness in the windshield.

For those patents which teach the use of a single drive spindle to control both the wiper arm and the control arm, see Great Britain Pat. No. 1,234,040 and U.S. Pat. No. 3,893,204, there is a problem in that torque arising during the operation of the wiper blade causes the drive spindle to bend and/or vibrate. When the drive spindle has a bushing around it which is snug against the outer circumference of the windshield, the vibration is directly transmitted to the windshield and this is undesirable. Also, the bending of the drive spindle can disrupt the oscillatory sweeps of the wiper blade. Still another solution to having only one hole formed in the windshield and still avoid the vibration problem is to mount the control arm on a bracket located on the outside of the windshield and to secure it to the windshield frame. However, with this design it is impossible to ensure a precise alignment between the position of the drive spindle which is mounted through the windshield from the inside and the control arm bracket which is mounted on the outside of the windshield. Any variations in the relative positions of the drive spindle to the control arm bracket affects the orientation of the wiper blade and/or the end positions of its oscillatory sweep of the windshield. By misaligning the wiper blade, the desired sweep surface may be unattainable.

Now an improved parallel arm windshield wiper assembly has been invented which resolves the drawbacks present in the prior art.

SUMMARY OF THE INVENTION

Briefly, this invention relates to a parallel arm windshield wiper assembly of the type in which a drive spindle projects through an aperture formed in a windshield. The drive spindle is connected at one end to a motor and has a wiper arm attached to its opposite end. The wiper arm supports a wiper blade which is aligned parallel to a control arm which is also pivotally connected near the outer end of the drive spindle. In addition, a wiper blade support member pivotally connects the distal end of the wiper arm to the distal end of the control arm. The improvement includes a spacer tube and a sleeve coaxially aligned about the drive spindle with the spacer tube being on the outside. A bracket is mateable to the outer end of the spacer tube and is held in place by a nut threaded onto the sleeve. The bracket is angled and has a stud secured to its distal end to which the control arm is pivotally attached. The position of the stud is such that a line drawn between the centers of the drive spindle and the stud combines with the wiper arm, the control arm and the wiper blade support member to form a parallelogram which permits the wiper blade to maintain a constant orientation throughout its oscillatory sweep on the windshield.

The general object of this invention is to provide an improved parallel arm windshield wiper assembly of the type in which a drive spindle projects through a single aperture formed in a windshield. A more specific object of this invention is to provide an improved parallel arm windshield wiper assembly of the type which has a drive spindle passing through a single aperture formed in the windshield without imparting vibration produced from the movement of the wiper blade back into the windshield.

Another object of this invention is to provide an improved parallel arm windshield wiper assembly which maintains the wiper blade in a set orientation throughout its oscillatory sweep on the windshield.

Still another object of this invention is to provide an improved parallel arm windshield wiper assembly which is easy to assemble and install onto a motor vehicle.

Other objects and advantages of the present invention will become more apparent to those skilled in the art in view of the following description and the accompanying drawings.

DETAILED DESCRIPTION OF THE PREFERRED EMBODIMENT

Figure 1:
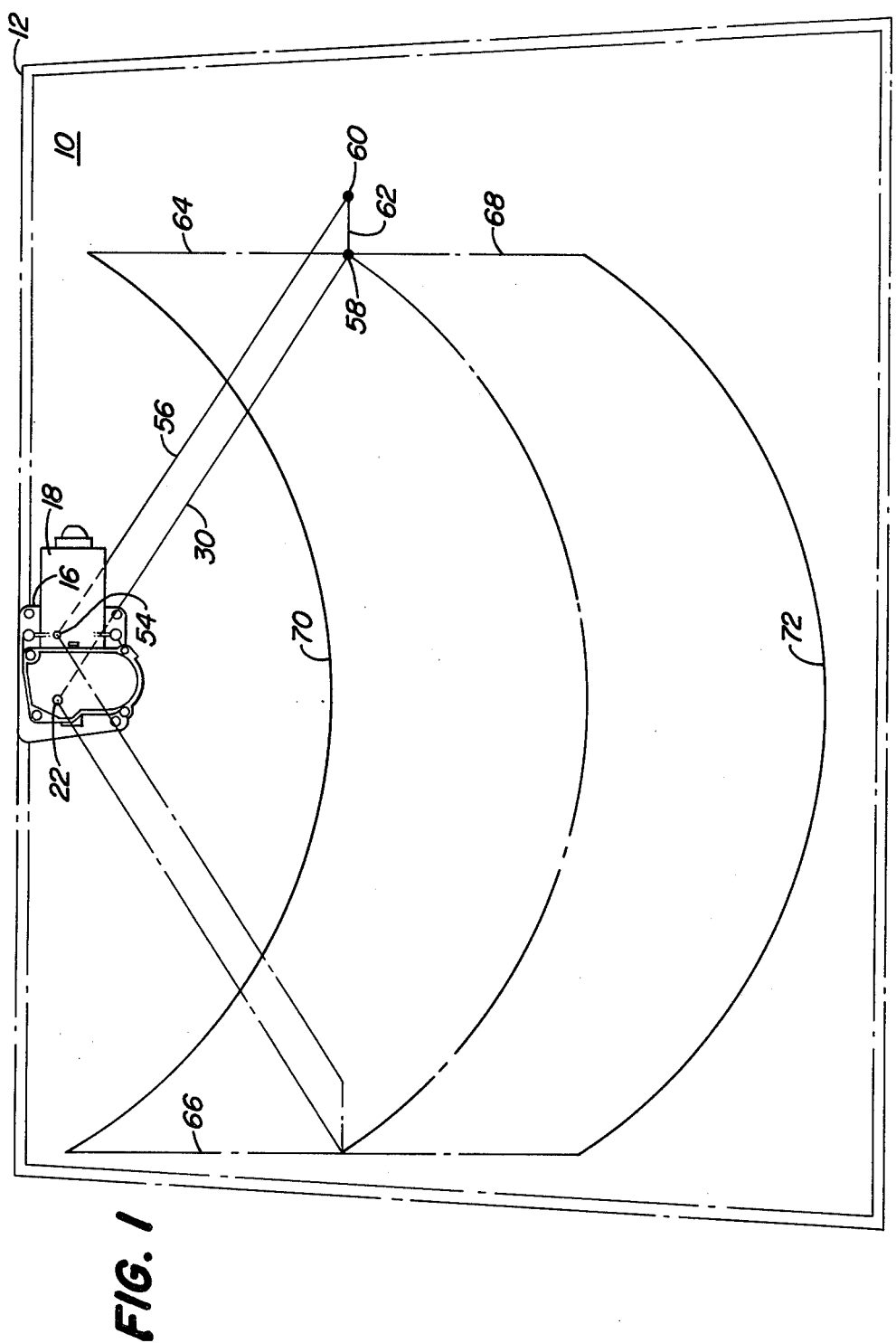
FIG. 1 is a schematic elevation view of the improved windshield wiper assembly as seen from the looking out from the inside of a vehicle.
Figure 2:
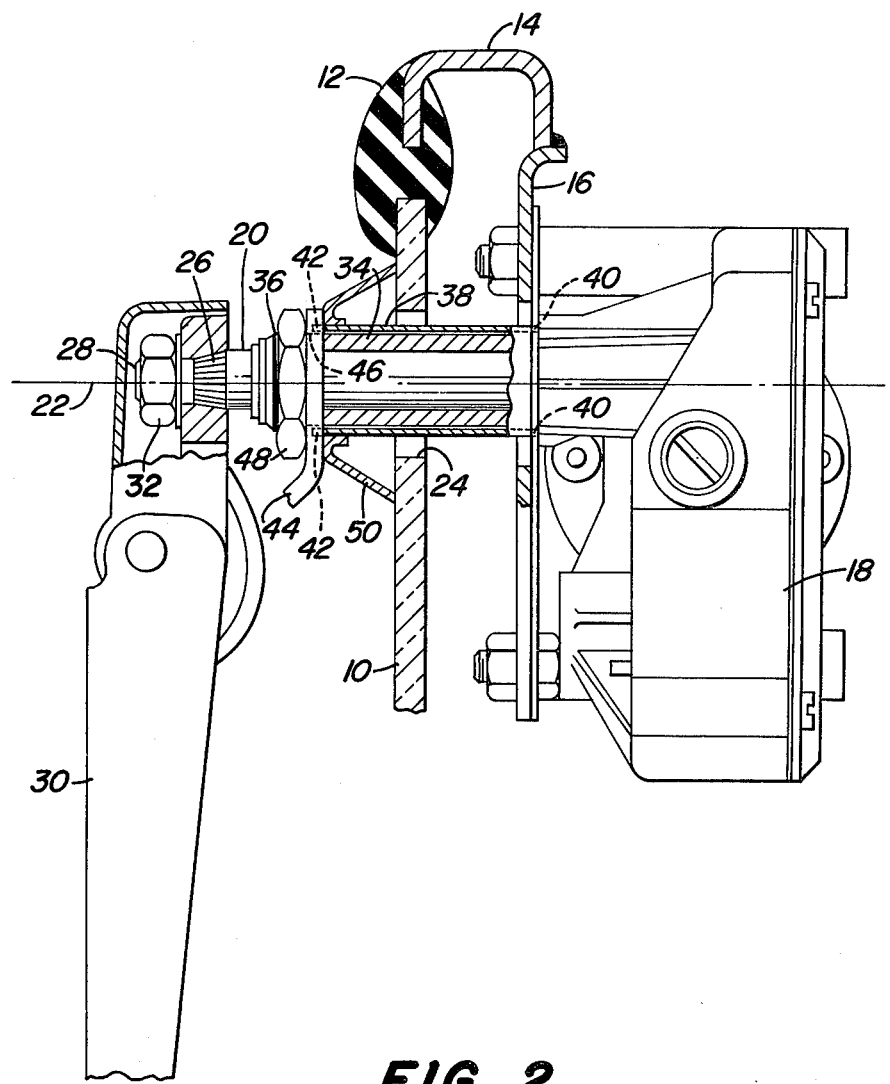
FIG. 2 is a partially sectional side elevation view of the improved windshield wiper assembly.
Figure 3:
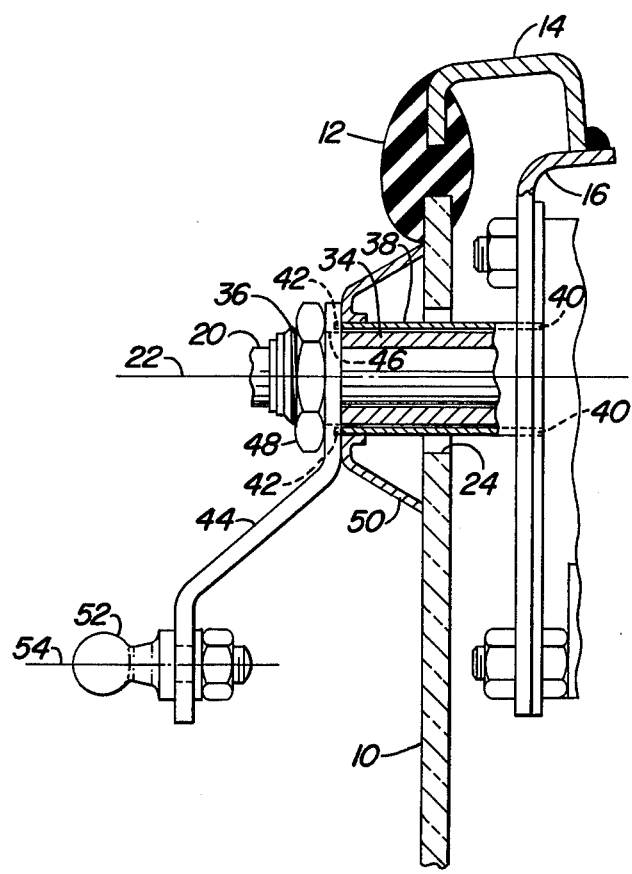
FIG. 3 is a partially sectional side elevation view of the improved windshield wiper assembly with the motor and wiper arm omitted in order to show the control arm bracket.

Referring to FIGS. 1-3, a glass or plastic windshield 10 is shown surrounded by a rubber strip 12 and a frame 14. A mounting plate 16 is attached to an upper portion of the inside surface of the frame 12 and has a motor 18 bolted to it. Projecting out from the motor 18 is a drive spindle 20 having a central axis 22. The drive spindle 20 projects through an aperture 24 formed in the windshield 10 and has a splined surface 26 and a threaded end 28 onto which a wiper arm 30 is fitted. The wiper arm 30 is secured to the drive spindle 20 by a nut 32.

Coaxially aligned about the drive spindle 20 is a hollow stationary sleeve 34 fixed to the motor 18 and having a threaded outer end 36 which tapers down in a step-like manner to the circumference of the drive spindle 20. Surrounding the sleeve 34 is a spacer tube 38 which has a pair of tabs 40 and 42 formed on its inner and outer ends, respectively, which project outward. The tabs 40 mate with a pair of slots formed in the outer surface of the mounting plate 16 while the tabs 42 mate with a pair of slots formed in a bracket 44. The bracket 44 is preferably angled outward away from the windshield 10, and contains an opening 46 at one end which permits the bracket 44 to be positioned about the sleeve 34. The bracket 44 is held in place against the spacer tube 38 by the tabs 42 and by a nut 48 threaded onto the end 36 of the sleeve 34. The purpose of the spacer tube 38 is to position the bracket 44 at a predetermined distance away from the windshield 10 while coaxially aligning and holding the bracket 44 stationary about the drive spindle 20. By so attaching the bracket 44, only one hole 24 has to be formed in the windshield 10 thereby reducing machining cost and eliminating the possibility of weakening the glass.

It should be noted that the inner diameter of the aperture 24 formed in the windshield 10 is larger than the outer diameter of the spacer tube 38. This size difference ensures that any vibration or bending motion imparted into the drive spindle 20 will not be transmitted to the windshield 10. In order to seal the aperture 24 a resilient skirt 50, preferably constructed of a plastic or rubber material, surrounds the spacer tube 38 and is sandwiched between the bracket 44 and the outside surface of the windshield 10. The resilient skirt 50 is shown as having a conical configuration thereby permitting greater tolerance discrepancy in the size of the aperture 24.

Mounted on an opposite end of the bracket 44 is a stud shaft 52 having a central axis 54, see FIG. 3. This stud shaft 52 pivotally supports one end of a control arm 56 which is aligned parallel to the wiper arm 30. The wiper arm 30 and the control arm 56 are pivotally connected at their outer ends 58 and 60, respectively, by a wiper blade support member 62 which has a wiper blade 64 mounted on it. These members 30, 56, 62 and 64 are shown in schematic form in FIG. 1, since their construction is known to those skilled in the art.

The parallelogram configuration made by the position of the wiper arm 30, the control arm 56, the wiper blade support arm 62 and a line drawn between the two centerlines 22 and 54 maintains the wiper blade 64 in a vertical orientation throughout the oscillatory sweep of the windshield 10. This provides a desirable shape to the cleaned surface of the windshield 10, which is defined at the sides by the limit positions 66 and 68 of the wiper blade 64 and at the top and bottom by the arcs 70 and 72 swept out by the tips of the wiper blade 64.

It should be noted that the distance between the two centerlines 22 and 54 can be changed by altering the length or shape of the bracket 44. This permits the bracket 44 to be formed with sufficient precision in relation to the desired dimension between the centerlines, 22 and 54, so that the wiper arm 30 is always retained parallel to the control arm 56.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. An improved parallel arm windshield wiper assembly comprising:
    (a) a drive motor attached to a stationary support plate, said support plate having an aperture formed therein with a set of notches arranged about the periphery of said aperture;
    (b) a drive spindle passing through both said aperture formed in said support plate and through an aperture formed in a windshield, said drive spindle connected at one end to said motor and having a wiper arm attached to a second end;
    (c) a spacer tube coaxially aligned about said drive spindle and extending through said aperture formed in said windshield, said spacer tube having a pair of outwardly extending tabs formed on first and second ends thereof, said tabs on said first end engaging in said set of notches formed in said support plate;
    (d) a sleeve coaxially arranged between said drive spindle and said spacer tube, said sleeve having an externally threaded end surface;
    (e) a bracket having an opening formed therein approximate a first end and having a set of notches formed about the periphery of said opening, said bracket being positioned about both said drive spindle and said sleeve with said set of notches mating with said tabs formed on said second end of said spacer tube, said bracket further being retained at said first end by a nut fastened on said threaded end surface of said sleeve;
    (f) a stud secured to a second end of said bracket;
    (g) a control arm aligned parallel to said wiper arm and being pivotally attached at one end to said stud; and
    (h) a wiper blade support member pivotally connected to distal ends of both said wiper arm and said control arm, a line drawn between the centers of said drive spindle and said stud combines with said wiper arm, said control arm and said wiper blade support member to form a parallelogram which permits said wiper blade to maintain a constant orientation throughout its oscillatory sweep of said windshield.

* * * * *